Nov. 7, 1961  R. A. PALMORE  3,007,651
AIR FILTERING APPARATUS
Filed Nov. 27, 1957  2 Sheets-Sheet 1
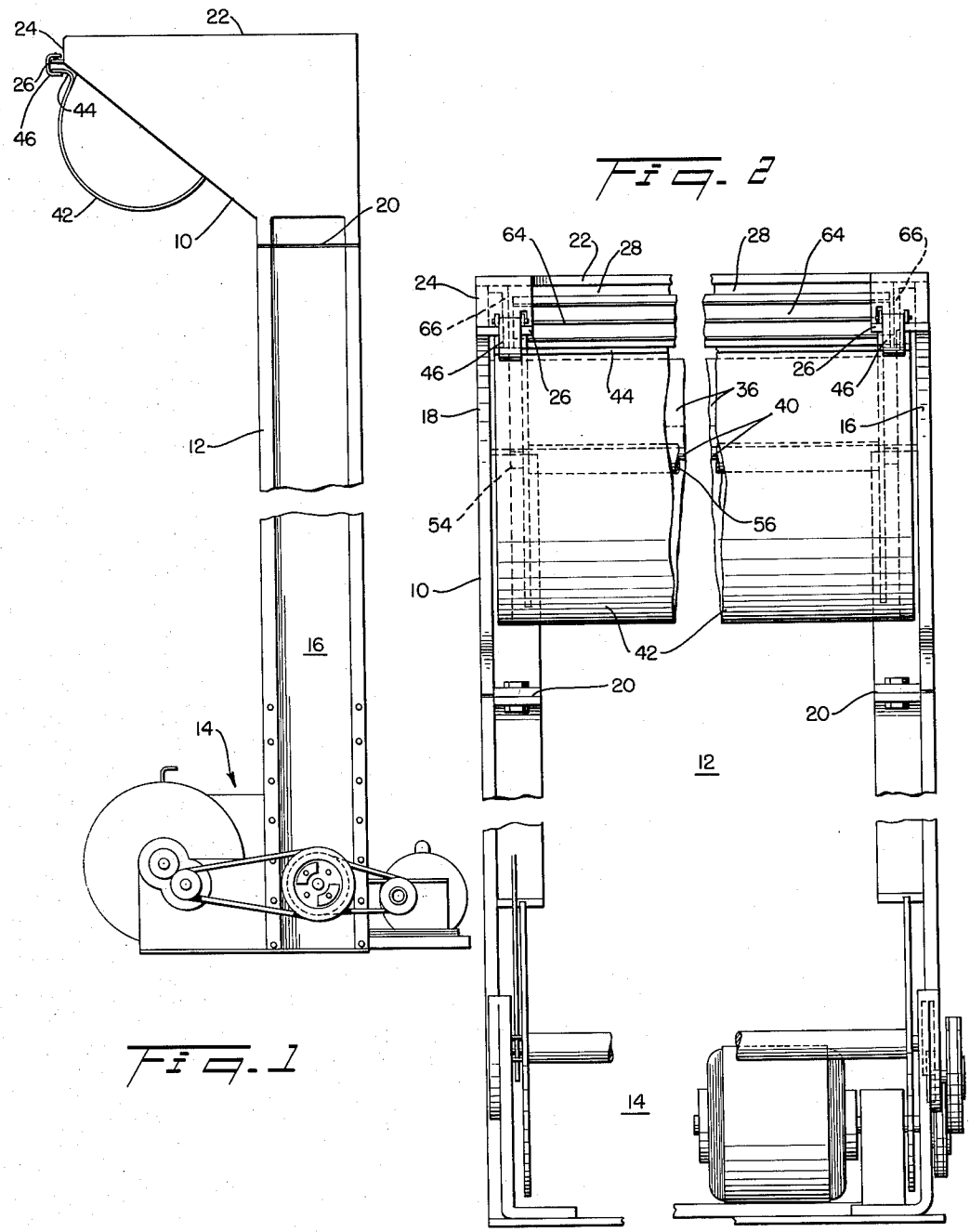
INVENTOR.
ROBERT A. PALMORE
BY W.D. Keith
ATTORNEY

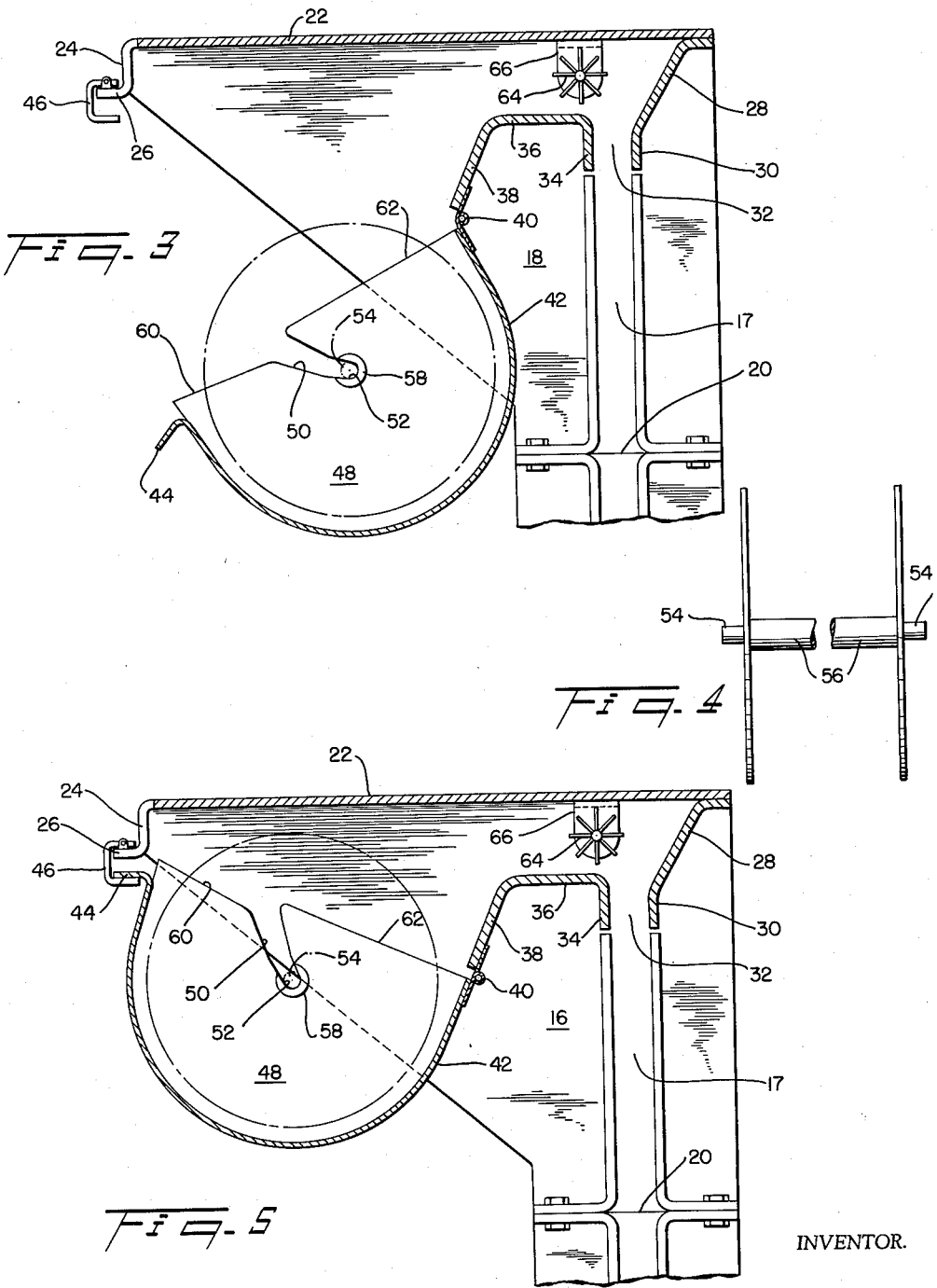

United States Patent Office 3,007,651
Patented Nov. 7, 1961

3,007,651
AIR FILTERING APPARATUS
Robert A. Palmore, Louisville, Ky., assignor to American Air Filter Company, Inc., Louisville, Ky., a corporation of Delaware
Filed Nov. 27, 1957, Ser. No. 699,374
3 Claims. (Cl. 242—55.53)

This invention relates to automatic air filters of the disposable medium type and more particularly to automatic air filters of the type wherein a web of expansible-compressible permeable material is maintained in convolutely wound compressed condition in a supply zone, passed through an air filtering zone in expanded condition and recompressed in a discharge zone so as to form a compact readily disposable package thereof.

The general type of air filter herein of particular concern is broadly disclosed in U.S. Patent No. 2,807,330, issued September 24, 1957. In automatic air filters of this type, interests of spatial economy make it desirable to maintain the convolutely wound supply of compressed filter medium in compressed condition in the supply zone and to permit its expansion to its operating air flow depth at the time of, or just prior to, its entry into the air filtering zone. In addition thereto, in vertically disposed filters of the general type herein of particular concern, the supply zone may be, and very often is, located at an appreciable distance above the level of the floor which introduces certain difficulties in the loading of the unit with a fresh supply of unused filter medium and adds to the difficulties attendant the threading operation.

This invention may be briefly described as an improved construction for the supply zone portion of automatic air filters of the disposable medium type that facilitates the loading and threading of unused filter medium therein.

The object of this invention is the provision of an improved construction for the supply zone portion of automatic air filters.

Other objects and advantages of the invention will be disclosed in the following disclosure and claims, and in the accompanying drawings which illustrate, by way of example, the principles of the invention and the presently preferred embodiments incorporating those principles.

Referring to the drawings:

FIG. 1 is a side elevational view of an automatic air filter of the disposable medium type.

FIG. 2 is a front view on an enlarged scale of the unit illustrated in FIG. 1.

FIG. 3 is an enlarged sectional view of the supply zone portion of an automatic air filter with the supply spool receiving trough disposed in open position.

FIG. 4 is a side elevational view of a supply spool.

FIG. 5 is an enlarged sectional view of the supply zone portion of an automatic air filter with the supply spool receiving trough disposed in closed position.

FIGS. 1 and 2 illustrate the essentials of an automatic air filter of the disposable medium type as broadly disclosed in the aforementioned Rivers U.S. patent. Such apparatus broadly includes a supply zone, generally designated 10, in which a convolutely wound supply of compressed filter medium is maintained in compressed condition upon a suitable spool; an air filtering zone, generally designated 12, through which filter medium, after removal from its compressed state in the supply zone, is incrementally advanced in expanded condition; and a discharge zone, generally designated 14, in which the used medium is recompressed and convolutely wound in compressed condition upon a suitable spool to form a compact readily disposable package thereof.

The type of automatic air filter herein of particular concern contemplates the use of a disposable filter medium in elongate web form and of an expansible-compressible permeable character. The medium is also of flexible character so that it may be directed along a somewhat tortuous path in its displacement from the supply zone to the discharge zone and through the air filtering zone as well as to permit its winding in compressed condition into a relatively compact roll. The terminology "expansible compressible" as used herein means a web of such character that the same may be compressed by one means or another to a depth of at least one-half that of its operating air flow depth and that such web will, by virtue of its inherent resilience, spring out or expand to its original expanded thickness when the forces maintaining it in compressed condition are released. A preferred web of this general type is the expanded filamentous or fiber glass mat or web disclosed in the Jackson United States Patent No. 2,798,531.

Referring to the drawings and in particular to the supply zone portion 10 of the illustrated air filter, there is provided a canopy like arrangement formed of a pair of vertically disposed, generally triangularly shaped side wall portions 16, 18 downwardly terminating in inwardly directed flanged portions 20 and having a horizontally disposed top wall or cover 22 disposed across the upper edges thereof. The flanged portions 20 permit fabrication of the supply zone portion 10 as an integral unit and facilitate site assembly by bolted securement thereof to companion flange portions on the side wall frame members that in part define the extent of the air filtering zone.

Dependent from the front edge of the top wall 22 and secured to the end portions of the side wall members 16, 18 is a vertically disposed front wall portion 24 having a forwardly directed flange 26 along the lower edge thereof. Dependent from the rear edge of the top wall 22 and secured at its ends to the abutting surfaces of the side wall portions 16, 18 is an inwardly directed sloping rear wall portion 28 having a vertically disposed flange like member 30 dependent from the lower edge thereof which defines one side of a preferably rectangular entry aperture 32 to the air filtering zone. Disposed parallel to and in uniform spaced relation with the member 30 is a vertically disposed cross plate member 34 supported by securement of the ends thereof to the side wall portions 16, 18. The members 30 and 34 cooperatively define the entry aperture 32 for the filter medium to the air filtering zone. The spacing intermediate the members 30 and 34 will be determined in part by the operating air flow depth of the particular filter medium that will be employed in a particular filter apparatus and preferably should be such as to effect a slight compression of the filter medium as it is advanced therethrough.

Each of the side wall portions 16, 18 also preferably carries an inwardly open channel 17 which extends downwardly from the dependent edge of the aperture 32 to provide a side guide and seal for the edges of the expanded filter medium and thereby prevent undesired flow of air therearound.

The member 34 preferably upwardly terminates in a horizontally disposed cross beam member 36 disposed parallel to and spaced from the top wall and secured in position by securement of the end portions thereof to the side wall portions 16 and 18. Dependent from the forward edge of the cross beam member 36 is a forwardly sloping wall portion 38. The wall portion 38, the cross beam member 36 and the filter medium entry aperture defining member 34 are preferably formed in one piece shaped to provide the above-described positional relationship therebetween. If desired, however, individual units positioned to approximate the illustrated arrangement may be employed. Pivotally secured, as by hinge members 40, to the dependent edge of the wall member 38 is the rear edge of an upwardly open supply spool receiving trough, and cover member generally designated 42. The supply spool receiving trough 42 is generally semi-circular in shape and is sized so that the projecting flange 44 on the front edge thereof will abut the flange 26 on the front wall 24 portion to permit securement of the trough 42 in closed position (as shown in FIGS. 3 and 5) by clamps 46 that are pivotally mounted on the flange 26. The clamps 46 are preferably shaped to encompass the flanges 26 and 44 and thereby support and maintain the trough 42 in closed position and to operate, when swung outwardly, so as to release flange 44 and permit downward and rearward displacement of the trough 42 about its pivotally supported rear edge.

The ends of the supply spool receiving trough 42 are provided with a pair of closure members 48. The closure members 48 are each provided with a slot 50 which extends from the somewhat diametrically disposed edge to the center as considered relative to the circumferential edge thereof. The end portions 52 of the slots 50 are preferably angularly disposed relative to the remainder thereof so that such end portions 52, in which the stub axles 54 of a supply spool 56 will be disposed, will be disposed substantially vertically when trough-like cover member 42 is disposed in its closed position. The end portions 52 are also preferably embossed as at 58 or otherwise provided with a bearing surface upon which the weight of a supply spool will be supported.

The somewhat diametrically disposed edge portion of each of the closure members 48 is formed in two sections. The section 60 disposed intermediate the slot 50 and the forward edge of the trough-like cover member 42 is angularly inclined so that the slope thereof, when the supply spool receiving trough 42 is disposed in open position, approximates the horizontal. The forward edge of the rear section 60 is sized to project above the level of the section 60 and thereby define a raised abutment to assure entry of the spool axles 54 into the slot 50.

The above-described angular disposition and sizing of the two section diametrically disposed edge portions of the end closure members 48 of the trough-like cover member 42, coupled with the above-described pivotal mounting of the cover member 42 greatly facilitates the loading and threading of the filter medium in the type of air filter apparatus herein of particular concern. The described pivotal mounting of the cover member 42 effects a marked reduction in the height at which the loading operation takes place. The advantage of this particular arrangement is apparent when it is realized that with relatively tall air cleaners, the individual or individuals who replace the supply spool must often work from the top of a ladder with the supply zone disposed near the end of their reach. In addition thereto, the trough-like shape of the member 42 coupled with the above-described disposition of the diametrically disposed edge portions of the end closures 48 permits ready introduction of the spool axles 54 into proper position. All that is required is the placing of the spool 56 in the trough-like cover 42. When so introduced the weight of the spool 56 will be supported by the engagement of the spool axles 54 with the forward edge portion 60 and introduction of the axles 54 into the slot 50 may be quickly and easily established by simply pushing the spool rearwardly. Final positioning of the axles 54 in the bearing seat 58 is automatically effected by displacement of the cover 42 to its closed position.

Threading operations are also facilitated by the above-described structure in that the weight of the spool is affirmatively supported at a location remote from its final operating position. Such advantage will be readily appreciated when it is realized that the threading operation requires temporary release of the compressive forces on the leading end of the web and consequent expansion thereof. The configuration of the trough serves to limit such expansion and its location, when in open position, provides adequate space for the necessary manipulation of the web attendant the threading of the lead end thereof into the air filtering zone.

Disposed in the horizontal channel formed by the top wall 22 and cross beam 36 is an elongated fluted roller 64 which may be supported by having its axially projecting ends extending through and journalled in appropriate mounting lugs 66 secured to the side wall 16, 18. If desired, one of the extending ends may be suitably formed to permit insertable engagement of a handle member therewith so as to permit manual rotation of the roller 64 during threading operations. The fluted roller 64 is preferably positioned in the vertical plane so that its periphery effects a marked compression of the web as it passes through the feed passage intermediate the top wall 22 and the roller surface and in the horizontal plane so that its periphery is disposed in alignment with the edge of the aperture 32 formed by the member 34 to effect a substantially right angle bend in the web immediately prior to its passage through the entry aperture 32. The above-described positioning of the roller 64 and consequent bending and compression of the web prior to its introduction into the air filtering zone materially aids in the prevention of any overfeeding of the web and consequent sagging or undesired compacting thereof occasioned by excess weight of the web column disposed in the filtering zone. In effect it "back tensions" the compressed web at the point of exit from the supply zone and markedly contributes to the smooth incremental feeding of the web across the filtering zone and the maintenance of the desired characteristics of the expanded medium while it is disposed in the air flow path.

Replacement of a supply roll of filter medium is readily effected by opening of the clamp members 46 and permitting displacement of the cover member 42 to its open position as illustrated in FIG. 3. Manual removal of the empty spool followed by insertion of a new spool of unusd compressed filter medium into the trough-like cover member 42 as described above completes the loading operation. As disclosed in the Rivers United States Patent 2,807,330, the end portions of the web are preferably provided with a paper or cardboard threading edge permanently secured to and maintaining the lead portion of the web in compressed condition. With the new spool properly positioned in the cover member 42, the restraining bands are released and the threading edge of the wab is advanced intermediate the periphery of the roller 64 and the top wall 22, and is introduced into the entry aperture 32. During the course of the threading operation and as mentioned earlier the unrestrained portions of the convolutely wound web will expand, because of its inherent resiliency, to its operating air flow depth with such expansion being partially limited by the enclosing circumferential portion of the cover member 42. After threading, the cover 42 is displaced to its closed position and in cooperation with the adjacent portions of the top wall 22, provides an expansion limiting enclosure for the new supply of filter medium. The enclosing of the supply roll as above described in conjunction with the inherent expansion characteristics of the unrestrained portions of the convolutely wound web results in friction engagement of the web surface with the walls of the enclosing members which serves to partially restrain or impede free rotation of the supply web and thereby contribute to an even rate of feed for the new filter medium. If desired, the bearing surface 58 for the spool shafts 54 may also be of such character as to provide a relatively high coefficient of friction to restrain free rotation of the supply roll mounted therein.

The use of the word "air" herein and in the appended claims includes other gaseous fluids.

Having thus described my invention, I claim:

1. A supply zone construction for automatic air filters of the type wherein a compressed convolutely wound supply web of expansible compressible filter medium is advanced through an air filtering zone in a substantially expanded condition and wherein air is passed through said expanded medium from the upstream side to the downstream side thereof, comprising a pair of side wall members and a top wall member disposed thereacross, means forming an entry aperture for said web of filter medium into said air filtering zone spaced closely adjacent said top wall member, means associated with said entry aperture means having a dependent edge disposed in spaced relation therewith on the upstream side of said air filtering zone and below said entry aperture forming means relative to said top wall member, a supply spool receiving trough having its rear edge pivotally connected to said dependent edge of said last mentioned means and displaceable from an open, supply spool receiving position wherein said trough is disposed entirely beneath said entry aperture forming means to a closed position with its front edge disposed adjacent said top wall member and with the portions thereof disposed below said pivotal mounting thereof being disposed remote from said air filtering zone whereby the full extent of the medium disposed in said air filtering zone is exposed to substantially unimpeded air flow therethrough.

2. The supply zone construction as set forth in claim 1 wherein said means associated with said entry aperture forming means is a cross beam member disposed in substantially air tight relation with the upstream side of said aperture forming means.

3. The supply zone construction as set forth in claim 1 including means disposed adjacent said top wall member for compressing said medium against said top wall member prior to its entry into said entry aperture forming means.

References Cited in the file of this patent

UNITED STATES PATENTS

| | | |
|---|---|---|
| 2,182,831 | Wagner | June 8, 1934 |
| 2,392,399 | Tator et al. | Dec. 4, 1945 |
| 2,487,763 | Patterson et al. | Nov. 8, 1949 |
| 2,807,330 | Rivers | Sept. 24, 1957 |